United States Patent
Jones et al.

(10) Patent No.: US 7,840,659 B2
(45) Date of Patent: *Nov. 23, 2010

(54) SYSTEM AND METHOD TO IDENTIFY DEVICES EMPLOYING POINT-TO-POINT-OVER ETHERNET ENCAPSULATION

(75) Inventors: Kenneth R. Jones, Cool, CA (US); Brian A. Gonsalves, Antioch, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/590,447

(22) Filed: Oct. 31, 2006

(65) Prior Publication Data

US 2007/0043873 A1    Feb. 22, 2007

Related U.S. Application Data

(63) Continuation of application No. 10/634,116, filed on Aug. 4, 2003, now Pat. No. 7,165,111.

(51) Int. Cl.
G06F 15/16 (2006.01)

(52) U.S. Cl. .................. 709/223; 709/201; 709/203; 709/216; 709/218

(58) Field of Classification Search ........... 709/245, 709/227, 203, 216, 218, 223, 224; 370/230
See application file for complete search history.

(56) References Cited

U.S. PATENT DOCUMENTS

| | | | |
|---|---|---|---|
| 6,327,511 B1 | 12/2001 | Naismith et al. | |
| 6,404,861 B1 | 6/2002 | Cohen et al. | |
| 6,496,859 B2 | 12/2002 | Roy et al. | |
| 7,099,944 B1 * | 8/2006 | Anschutz et al. ............ | 709/227 |
| 2002/0095299 A1 * | 7/2002 | Iwakata ......................... | 705/1 |
| 2002/0156947 A1 * | 10/2002 | Nishio ........................... | 710/36 |
| 2003/0053443 A1 | 3/2003 | Owens et al. | |
| 2003/0103615 A1 | 6/2003 | Baltes et al. | |
| 2003/0131133 A1 * | 7/2003 | Nyu et al. ................. | 709/245 |
| 2004/0071133 A1 | 4/2004 | Yusko et al. | |
| 2004/0105444 A1 | 6/2004 | Korotin et al. | |

(Continued)

FOREIGN PATENT DOCUMENTS

JP    11122277 A    4/1999

(Continued)

OTHER PUBLICATIONS

RFC 2516, A Method for transmitting PPP over Ethernet (PPPoE), Feb. 1999, L.Mamakos et al.*

(Continued)

*Primary Examiner*—Djenane M Bayard
(74) *Attorney, Agent, or Firm*—Toler Law Group

(57) ABSTRACT

A method and system for use in identifying customer premises equipment (CPE) in a distributed network are presented. The method includes receiving a first point-to-point-over Ethernet active discovery packet generating a device identifier code that identifies a product model of a customer premises equipment (CPE) device, and sending a second point-to-point over Ethernet (PPPoE) active discovery packet. The second PPPoE active discovery packet includes a tag that includes the device identifier code.

15 Claims, 7 Drawing Sheets

U.S. PATENT DOCUMENTS

| | | |
|---|---|---|
| 2005/0129002 A1 | 6/2005 | Koo |
| 2006/0161643 A1 | 7/2006 | Senapati et al. |

FOREIGN PATENT DOCUMENTS

| | | | |
|---|---|---|---|
| JP | 2003189378 A | 7/2003 | |
| JP | 2003204345 A | 7/2003 | |
| WO | 0178310 A | 10/2001 | |
| WO | 02077808 A | 10/2002 | |

OTHER PUBLICATIONS

Mamakos L, et al., "RFC 2516: A Method for Transmitting PPP over Ethernet (PPPoE)," http://www.ietf.org/rfc/rfc2516.txt?number=2516>, May 14, 2002.

Non-Final Office Action mailed Jan. 25, 2005, 14 pages, and Response to Non-Final Office Action filed Apr. 25, 2005, 13 pages, for U.S. Appl. No. 10/634,116.

Notice of Non-Compliant Amendment mailed Jul. 13, 2005, 2 pages, and Response to Notice of Non-Complaint Amendment filed Aug. 11, 2005, 13 pages, for U.S. Appl. No. 10/634,116.

Final Office Action mailed Nov. 14, 2005 18 pages, and Remarks in Support of Pre-Appeal Brief Request for Review filed Jan. 6, 2006, 5 pages, for U.S. Appl. No. 10/634,116.

Brief in Support of Appeal filed Apr. 17, 2006, 25 pages, for U.S. Appl. No. 10/634,116.

Non-Final Office Action mailed Jul. 24, 2006, 5 pages, and Response to Non-Final Office Action filed Aug. 18, 2006, 2 pages, for U.S. Appl. No. 10/634,116.

Translation for Notice of Grounds for Rejection mailed Sep. 29, 2009, 3 pages, for Patent Application No. JP 2006-522554.

Supplemental European Search Report from the European Patent Office for corresponding EP Application No. 04755828.3-2416/1652099, Patent No. PCT/US2004019922, dated Aug. 28, 2008, 3 pages.

Communciation pursuant to Article 94(3) EPC mailed Nov. 14, 2008, 6 pages, and Response mailed Feb. 27, 2009, 20 pages for EP Application No. 04755828.3-2416.

Communciation pursuant to Article 94(3) EPC mailed Mar. 10, 2008, 3 pages, and Response mailed Jul. 10, 2009, 11 pages for EP Application No. 04755828.3-2416.

International Search Report and Written Opinion received in corresponding PCT Application No. PCT/US04/19922 from the International Searching Authority Mar. 10, 2005, 13 pages.

\* cited by examiner

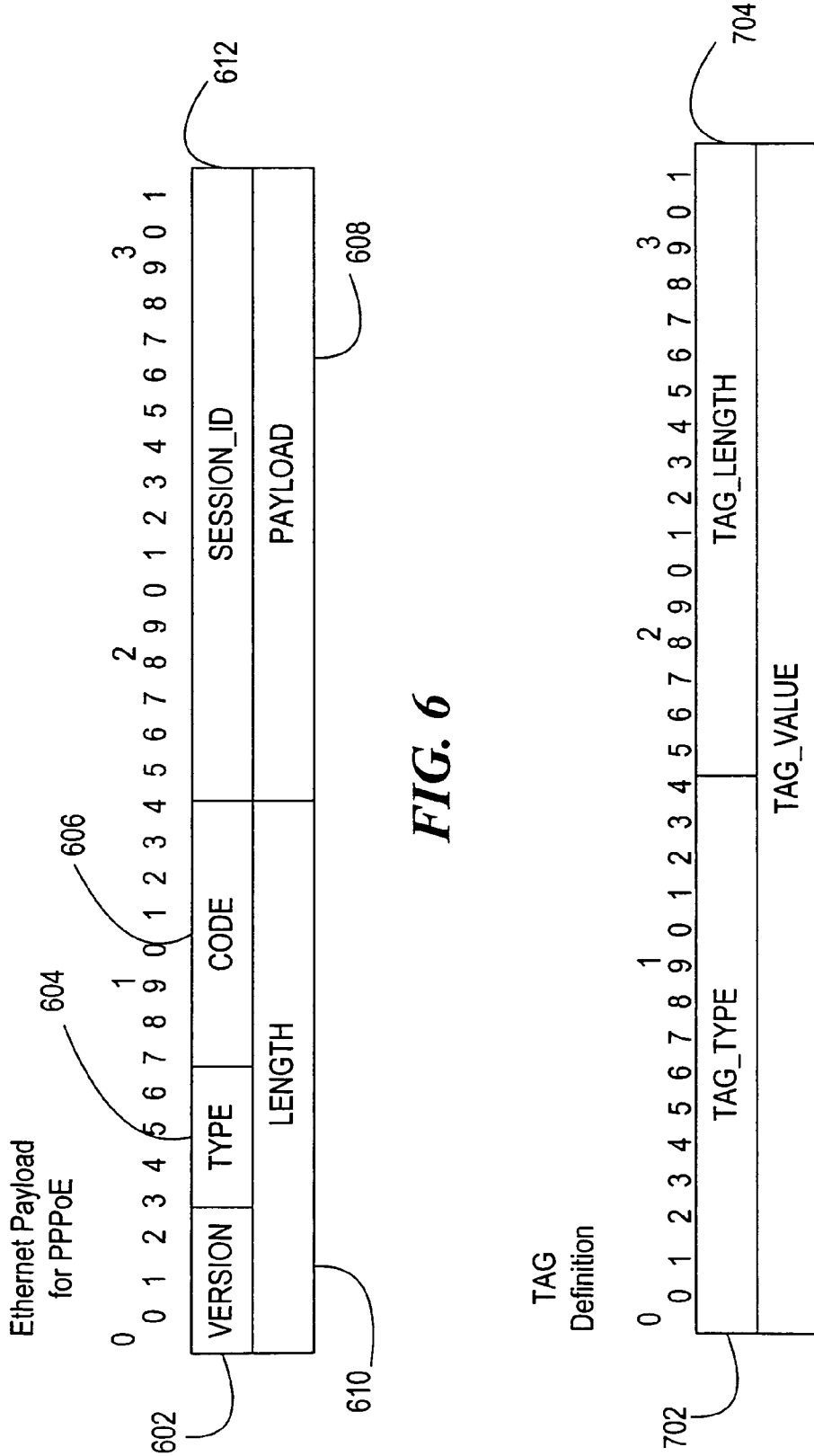

SYSTEM AND METHOD TO IDENTIFY
DEVICES EMPLOYING
POINT-TO-POINT-OVER ETHERNET
ENCAPSULATION

CLAIM OF PRIORITY

The present application claims priority from and is a continuation of patent application Ser. No. 10/634,116 filed on Aug. 4, 2003 and entitled "System and Method to Identify Devices Employing Point-to-Point-Over Ethernet Encapsulation," the contents of which are expressly incorporated herein by reference in their entirety.

BACKGROUND

1. Field of the Disclosure

The present disclosure relates generally to point-to-point-over Ethernet device identification.

2. Description of the Related Art

Broadband service providers for distributed computing network services such as digital subscriber line (DSL) service typically require the end user, e.g., the home or business DSL subscriber, to employ a router, switch, or other customer premises equipment (CPE) to terminate the DSL connection at the residence or business location. The router or other CPE serves to terminate the Asynchronous Transfer Mode (ATM) connection, and generally utilizes point-to-point-over-Ethernet (PPPoE) enabled software to complete the user authentication process.

When a DSL subscriber encounters a problem with their DSL connection, the DSL service provider has no way to automatically determine the specific make and/or model of a particular CPE device being utilized by the DSL subscriber. In this situation, telephone inquiries to the subscriber are made to attempt to discover what type of equipment is being utilized at the CPE location, or a service technician is dispatched to "eyeball" the equipment when the customer does not know what type of CPE device is at their location. Consider a typical case of tens of thousands (or even millions, in some cases) of DSL subscribers and their respective CPE devices, and the support problems presented to the DSL service provider become evident.

In addition, when a service provider wishes to upgrade DSL transport services in their service area(s), e.g., the provision of Point to Point Protocol Termination and Aggregation (PTA), it may be difficult to cost-effectively deploy the new service plan if the service provider does not know what types of CPE devices are currently deployed. For example, if a new transport service is scheduled for deployment in a specific geographic region, but it is determined that a large number of CPE devices may not support the new service, delays in deployment result. Such delays lead to increased provider costs, which are typically passed along to the subscribers, resulting in higher rates.

Accordingly, there is a need for a system or method which is capable of automatically identifying CPE devices in a service provider's service area.

SUMMARY

A method for identifying customer premises equipment (CPE) in a distributed network is presented. In a particular embodiment, the method includes broadcasting a point-to-point over Ethernet (PPPoE) active discovery initiation (PADI) packet and transmitting a point-to-point over Ethernet (PPPoE) active discovery request (PADR) packet. The PADI packet, the PADR packet, or any combination thereof, includes a tag that identifies a product model of a CPE device.

In another particular embodiment, the method includes receiving a first Point-to-Point-Over Ethernet active discovery packet, generating a device identifier code that identifies a product model of a customer premises equipment (CPE) device, and sending a second point-to-point over Ethernet (PPPoE) active discovery packet. The second PPPoE active discovery packet includes a tag that includes the device identifier code.

In another embodiment, a network management system is presented. The network management system, includes a server adapted to communicate with a distributed network to receive a plurality of PPPoE active discovery packets from a plurality of customer premises equipment (CPE) devices and to identify each of the plurality of CPE devices based on the plurality of PPPoE active discovery packets. Each of the plurality of PPPoE active discovery packets includes a tag comprising a device identifier field that uniquely identifies a product model of a CPE device that transmitted the PPPoE active discovery packet.

BRIEF DESCRIPTION OF THE DRAWINGS

FIG. 6 illustrates an Ethernet payload for point-to-point over Ethernet (PPPoE);

FIG. 7 illustrates a tag for use in an Ethernet payload; and

The use of the same reference symbols in different drawings indicates similar or identical items.

DESCRIPTION OF THE DRAWINGS

The present disclosure provides a method, system, and apparatus for use in identifying customer premises equipment (CPE) in a distributed network. The method utilizes a unique identifier that is provided by a CPE device to an access concentrator during the discovery stage of point-to-point over Ethernet (PPPoE) communications in a distributed network. An access concentrator collects this CPE-provided information, which may be used by a broadband service provider to identify, and thus manage, the CPE devices which form a part of the service provider's network domain. An example of a distributed network system including a collection of domains with one or more networks is illustrated in FIG. 1.

Figure 1:
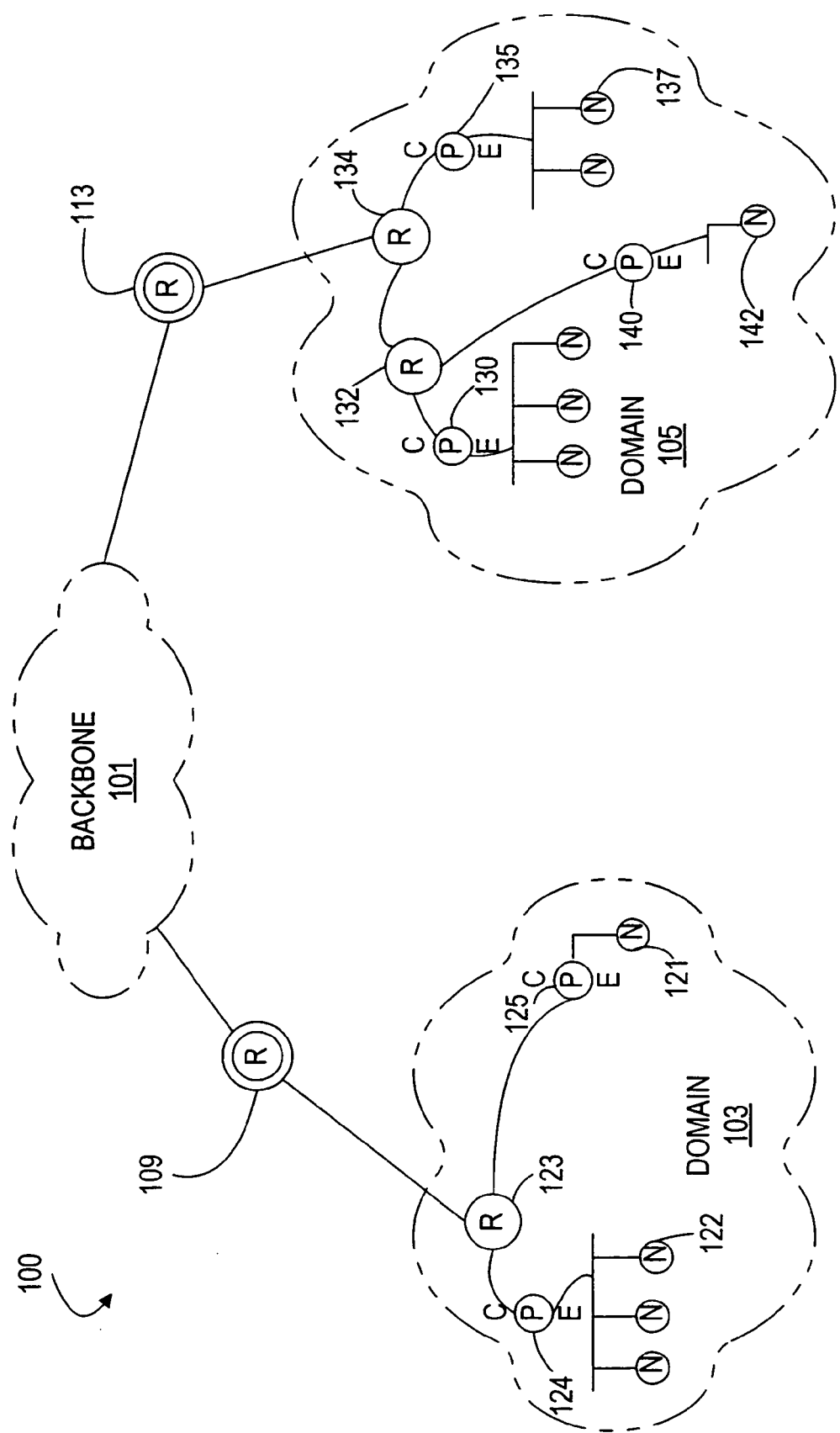
FIG. 1 is a simplified diagram of a distributed network.

FIG. 1 is a simplified example of a distributed network, and is referred to as distributed network system 100. Distributed network system 100 can include numerous routing domains 103 and 105, which are connected to a backbone network 101. In a hierarchically arranged network system, backbone 101 is the central connection path shared by the nodes and networks connected to it. The backbone 101 administers the bulk of traffic between communicating nodes to provide end-to-end service between one user, for example, source node 121 in domain 103, and another user, for example destination node 142.

Each routing domain 103, 105 in distributed network system 100 is a collection of one or more local networks that are attached to the backbone 101 through one or more routers 123, 124, 125, 130, 132, 134, and 135. A router is a specialized computer for processing Internet protocol (IP) data and forwarding IP data along respective network paths. In the following discussion, the term local network shall be used to refer to all types of networks that may be included in a domain. Routing domains 103 and 105 are also referred to as autonomous systems (AS). An autonomous system is a set of nodes and routers that operate under the same administration. The domains 103 and 105 may be operated by the same service provider (same administration) or by different service providers. The networks in routing domains 103 and 105 may be residence/subscribers' home networks, local area networks (LAN), wide area networks (WAN), metropolitan area networks (MAN), or the like.

In a point-to-point (PPP) connectivity network, various types and models of CPE devices such as CPE devices 124 and 125, or 130, 140, and 135 are used to terminate the point-to-point (PPP) connections. One type of point-to-point connectivity communications is point-to-point over Ethernet (PPPoE). With various types of broadband access, e.g. digital subscriber line (DSL) service, connectivity may be provided via PPPoE within the domains 103 and 105. It will be appreciated that the numbers of networks, routers, CPE devices, and nodes (nodes are depicted by a circle with 'N' inscribed within the circle) have been constrained in the example of FIG. 1 to avoid clutter.

Broadband access service, such as digital subscriber line (DSL) service, entails the use of a CPE device to terminate the DSL (PPPoE) connection at the residence or business location of the DSL subscriber. This is illustrated in FIG. 2, which illustrates a simplified diagram of a point-to-point connection being established.

Figure 2:
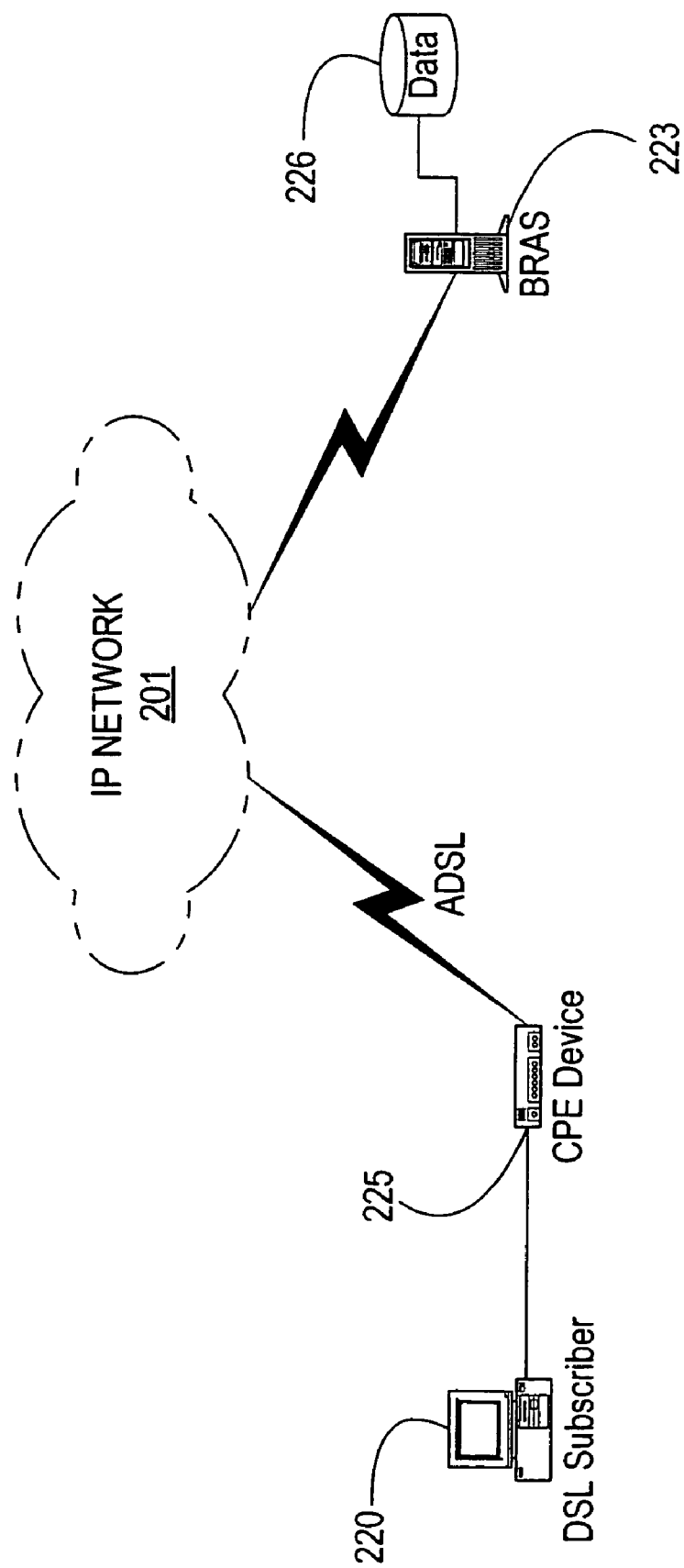
FIG. 2 is a simplified diagram of a customer premises equipment (CPE) device connected via an IP network to an access concentrator.

FIG. 2 illustrates a CPE device 225 connected through an IP network 201 to an access concentrator 223. In an embodiment, the access concentrator 223 is a broadband remote access server (BRAS).

Typically, the CPE device 225 terminates the asynchronous transfer mode (ATM) connection, and has point-to-point over Ethernet (PPPoE) software to complete a user authentication process. The CPE device 225 may be a router or a switch, or any device that terminates a PPPoE connection. The CPE device 225 contains a module configured to transmit a PPPoE packet including a tag to uniquely identify the CPE device 225 product model. Access concentrator 223 is connected to a database 226 to store the device identifier field data obtained from the CPE device 225 during discovery/authentication processes. The method utilizes the packet exchange during the conduct of a PPPoE discovery process.

Figure 3:
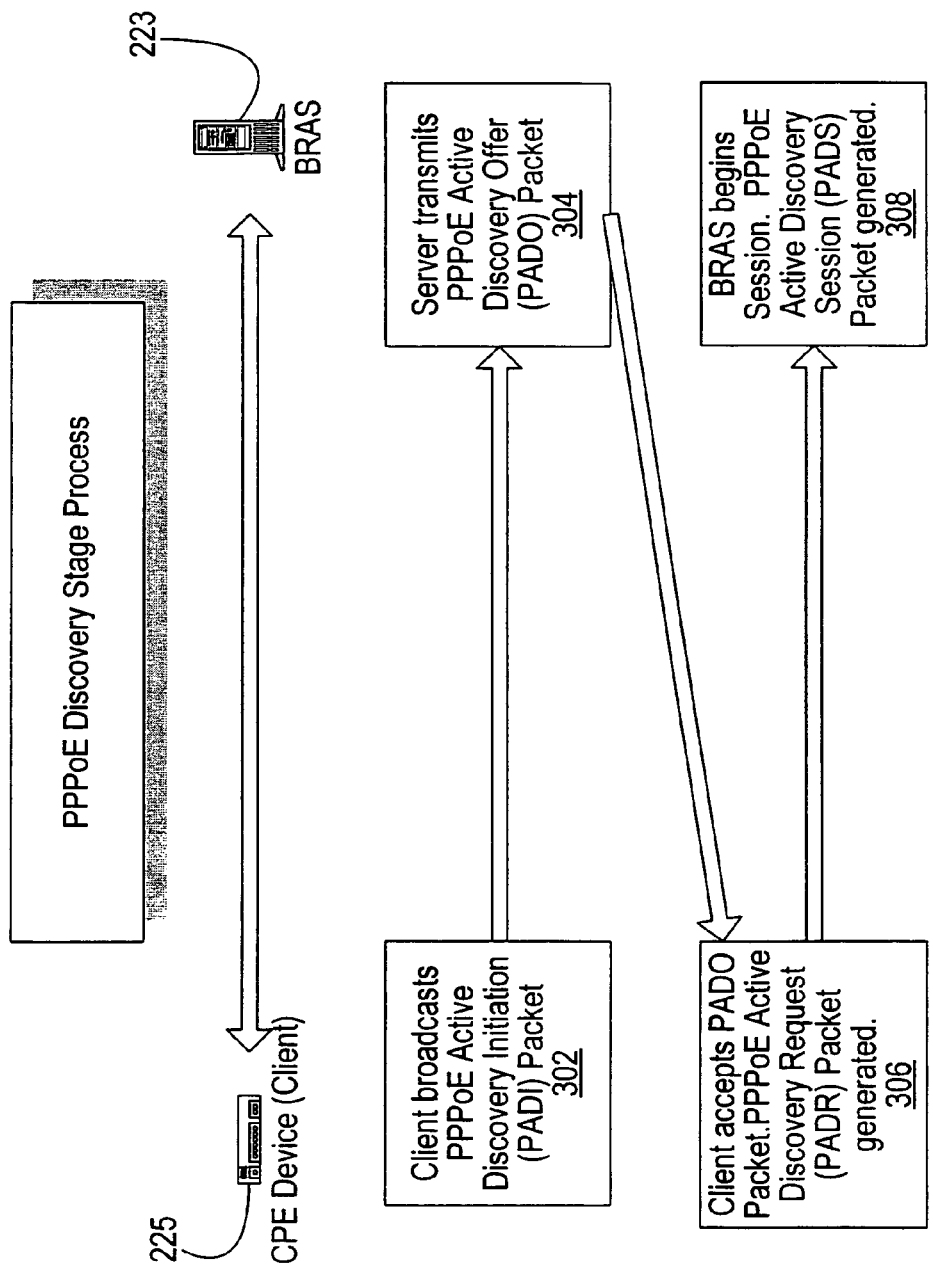
FIG. 3 is a flow diagram illustrating the stages of PPPoE discovery.

PPPoE has two distinct stages, a discovery stage, and a PPP session stage. When a host wishes to initiate a PPPoE session, it first performs discovery to identify the Ethernet media access control (MAC) address of the peer, and establishes a PPPoE SESSION_ID. Although PPP defines a peer-to-peer relationship, discovery is a client-server relationship. That is, in the discovery process, a host (the client, or CPE device 225) discovers an access concentrator 223 (the server), and various discovery steps are followed to permit the host and the server to have the information required to build their point-to-point connection over Ethernet. This discovery process is illustrated in FIG. 3.

The method and system disclosed herein utilizes a tag identified in Internet Engineering Task Force (IETF) RFC 2516 (A Method for Transmitting PPP over Ethernet (PPPoE)) in an innovative way to determine which CPE devices, such as CPE device 225, are connected to a network. The client (CPE 225) is capable of generating a device identifier code in response to receiving a PPPoE packet communicated over a distributed network. In the first step 302 of the discovery process, the CPE device 225 broadcasts a PPPoE active discovery initiation (PADI) packet. This PADI packet includes a tag that specifically identifies a product model of the CPE device 225. The tag in a particular embodiment is a host-uniq tag, and the device identifier code is a binary number associated with a specific product model or type of CPE device. In a specific embodiment, the binary number is a nine bit binary number.

The access concentrator 223, such as the broadband remote access server (BRAS), transmits a PPPoE active discovery offer (PADO) packet in step 304. In step 306, the PADO packet is received by the client 225, and accepted. In response to the PADO packet receipt, an active discovery request packet (PADR) packet is generated and transmitted to the server 223. The PADR packet can also include a tag that specifically identifies a product model of the CPE device 225. In step 308, the server receives the PADR packet, and generates and transmits a PPPoE active discovery session (PADS) confirmation packet. The session discovery process is concluded, and an Ethernet communication session is then conducted between the client 225 and the server 223.

The host-uniq tag information may be transmitted in the PADI packet. Alternatively, the host-uniq tag information may also be transmitted in the PADR packet. Generally it is most efficient to utilize the PADI packet for device identification, however, the CPE device could return the device identifier in the tag with a PADR packet as well. Whether the tag information is contained in the PADI or PADR packets, the access concentrator 223 receives the PAD packet, and stores the device identifier code in a database (226, FIG. 2). After collection of the device identifier codes in the tag, the database can be used to determine the specific product model of a CPE device based on the information embedded in the tag. This information is then available to be provided to customer service representatives to diagnose and repair user problems, thereby decreasing the number of customer site visits and subscriber call requests required of service technicians.

An advantage provided by the disclosed method is that it facilitates network management based upon the product model of the CPE devices determined to be present in the network. For example, the use of the host-uniq tag and the unique device identifier allows broadband service providers to check on the CPE devices in use on the provider's network. This information could be used to target marketing efforts, or to enable surveys of existing equipment to determine if the existing equipment will work with new technologies that a broadband service provider would like to deploy. It should be noted that although the examples provided thus far have discussed primarily DSL broadband services, PPPoE is an authentication system that is not restricted to DSL.

Figure 4:
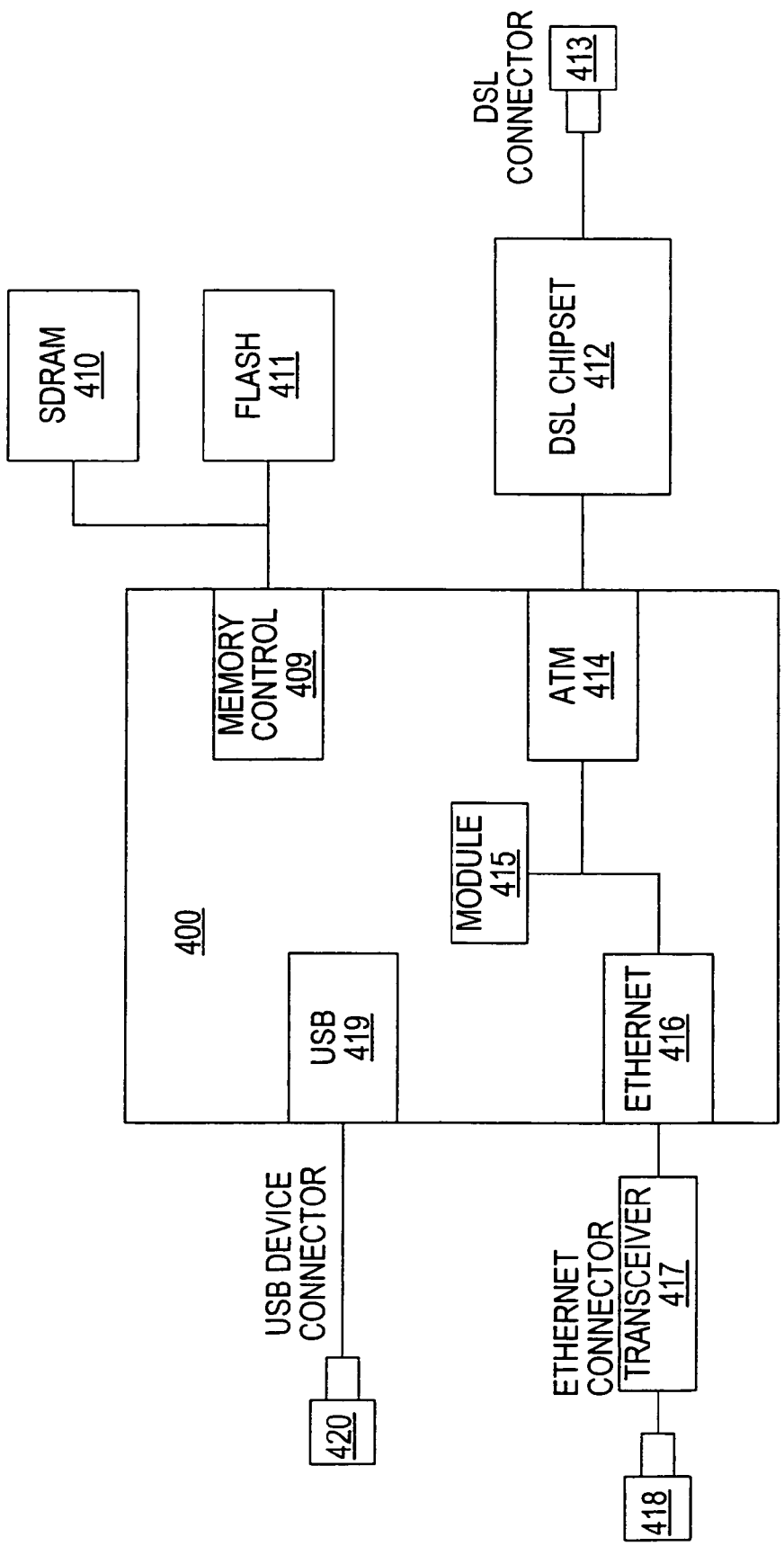
FIG. 4 is a block diagram of an ADSL bridge/router board which incorporates a module configured to transmit a point-to-point over Ethernet (PPPoE) active discovery packet, including a tag.

FIG. 4 is a block diagram of an ADSL bridge/router board 400 incorporating a module 415 configured to transmit a point-to-point over Ethernet (PPPoE) active discovery packet including a tag. In a particular embodiment, the tag comprises a device identifier field that uniquely identifies a CPE product model. It will be appreciated that, with the exception of module 415, the block diagram of FIG. 4 is provided as a generic example of an integrated microprocessor designed to meet the needs of communications applications, and as such does not represent the only architecture possible for CPE devices.

CPE board 400 includes a memory control module 409 with connecting Flash 411 and SDRAM 410 memory components. Other components in board 400 include a universal serial bus (USB) controller 419 and a USB device connector 420; an ATM segmentation and reassembly (SAR) controller module 414; a DSL chipset 412 and DSL connector 413; a 10/100 Mbps Ethernet controller module 416, transceiver 417, and connector 418. ATM controller module 414 and Ethernet controller module 415 have been integrated into the board 400 as network interfaces.

During a PPPoE discovery process, module 415 sends a PPPoE active discovery (PAD) packet. The PAD packet includes a tag comprising a device identifier field that uniquely identifies a CPE product model. The device identifier field can also be generated in response to receiving a PAD packet. The PAD packet containing the tag/device identifier can be a PADI packet, or alternately, a PADR packet. In one embodiment, the tag is a host-uniq tag, and the device identifier field comprises a predefined binary number embedded in the host-uniq tag. This predefined binary number can be a nine-bit binary device identifier code.

Figure 5:
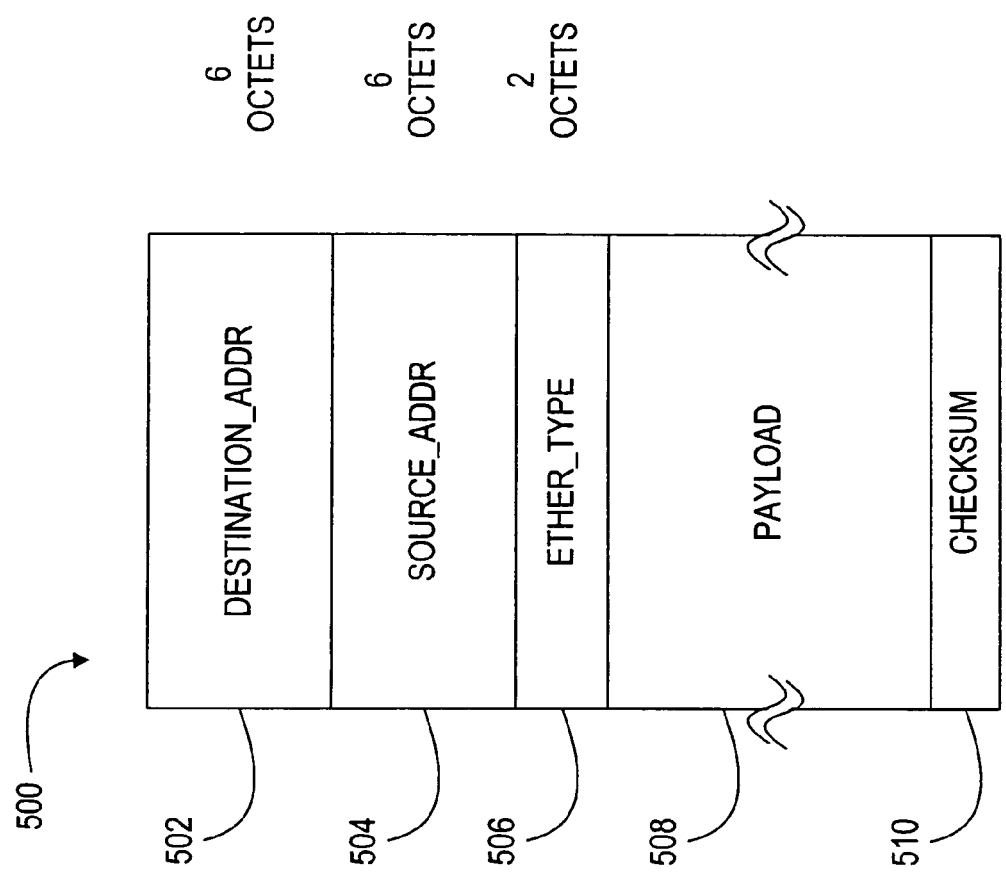
FIG. 5 illustrates a data packet for use in a distributed network.

FIG. 5 illustrates a data packet 500 for use in a distributed network. The data packet 500 includes a destination address field (DESTINATION_ADDR) 502 which typically contains either a unicast Ethernet destination address, or the Ethernet broadcast address (0xffffffff). For discovery packets, the field 502 value is either a unicast or a broadcast address. For PPP session traffic, the field 502 value contains the peer's unicast address as determined from the discovery stage.

A source address field (SOURCE_ADDR) 504 is also contained in data packet 500. This field 504 contains the Ethernet media access control (MAC) address of the source device. The ETHER_TYPE field 506 is set to a first value during the discovery stage, or to a second value during the PPP session stage. The payload field 508 contains the Ethernet payload for PPPoE, and is discussed in detail in FIG. 6. The checksum field 510 serves to verify packet integrity.

FIG. 6 illustrates an illustrative Ethernet payload that may be used with PPPoE. The VERSION field 602 is four bits, and identifies the version number of the PPPoE specifications, e.g., 0x1. The TYPE field 604 is four bits, and identifies the Ethernet type for a given version of PPPoE specifications. The CODE field 606 is eight bits, and the CODE field value depends upon whether discovery stage or PPP stage is in effect.

The SESSION_ID field 612 is 16 bits, and is an unsigned value in network byte order. For a given PPP session, the field 612 is fixed, and defines a PPP session along with the Ethernet source address (504 in FIG. 5) and destination address (502 in FIG. 5). In the discovery stage, the SESSION_ID field 612 has a different value depending upon the type of discovery packet in which field 612 is contained. The LENGTH field 610 is 16 bits having a value, in network byte order, that indicates the length of the PPPoE payload 608.

A PPPoE payload 508 contains zero or more tags. A tag is a type-length-value (TLV) construct, and an example tag is shown in FIG. 7. The sample tag includes a TAG_TYPE field 702 that is a 16 bit field in network byte order. A list of tag types that may be present in the field 702 includes tag types end-of-list, service-name, AC-name, host-uniq, and AC-cookie tags. The TAG_LENGTH field 704 is 16 bits, and is an unsigned number in network byte order which indicates the length in octets of the TAG_VALUE 706.

IETF RFC 2516 defines the host-uniq tag as follows: "This tag is used by a host to uniquely associate an access concentrator response (PADO or PADS) to a particular host request (PADI or PADR). The TAG_VALUE is binary data of any value and length that the host chooses. It is not interpreted by the access concentrator. The host may include a host-uniq tag in a PADI or PADR. If the access concentrator receives this tag, it must include the tag unmodified in the associated PADO or PADS response." From the foregoing IETF definition, it should be clear that although the present disclosure utilizes a predefined tag, the tag is utilized in a unique way to identify CPE devices, as well as to collect CPE device information at the access concentrator or database server attached to the access concentrator, for network management purposes.

Figure 8:
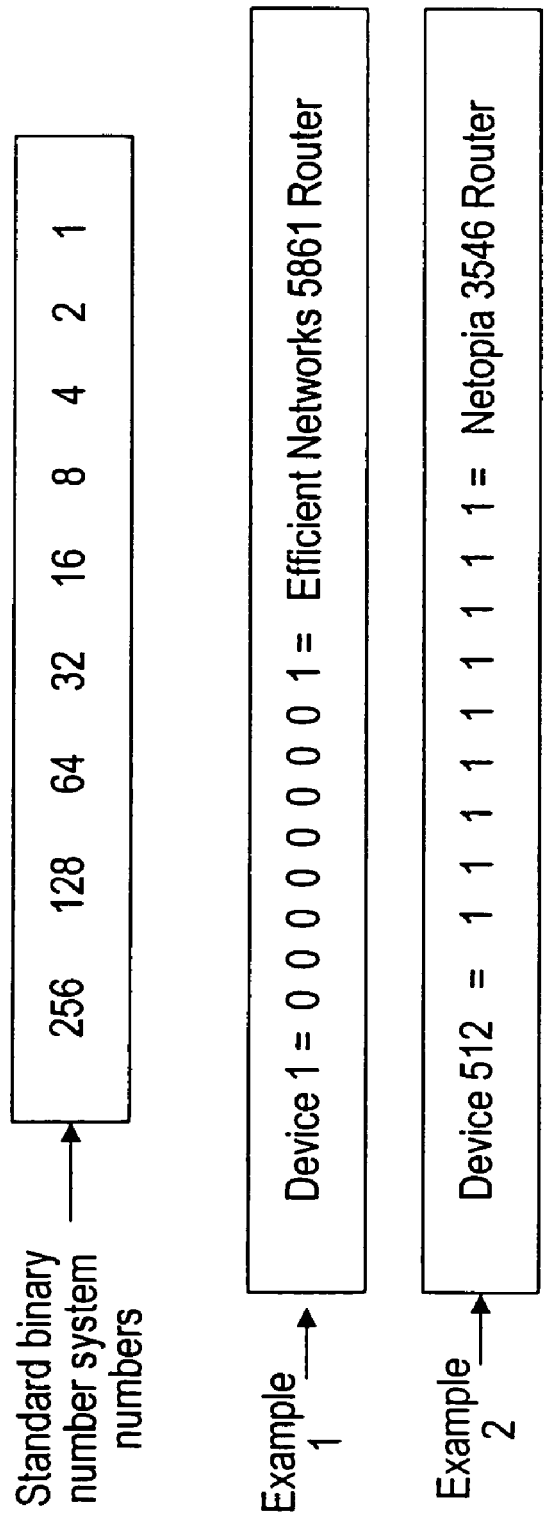
FIG. 8 illustrates an example of a nine binary bit CPE device identifier code embedded in the 0x0103 host-uniq tag.

An example of a nine bit binary CPE device identifier code embedded in a host-uniq tag is illustrated in FIG. 8. The CPE device identifier code uses numbers in the standard binary number system to produce any particular CPE device number between 0 and 512. In Example 1 of FIG. 8, an Efficient Networks 5861 Router has the binary number 000000001, making its device binary number equal to 1. In Example 2, a Netopia 3546 Router has the binary number 111111111, making its device binary number equal to 512. Using the examples of FIG. 8, when a device identifier code transmitted to the access concentrator/database from the CPE device is 111111111, the determination would be that this CPE device model type is a Netopia 3546 Router. Similarly, when the identifier code received is 000000001, the access concentrator would determine that the CPE device model type is an Efficient Networks 5861 Router.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
broadcasting a point-to-point over Ethernet (PPPoE) active discovery initiation (PADI) packet from a Customer Premises Equipment (CPE) device to a Broadband Remote Access Server (BRAS);
receiving a PPPoE Active Discovery Offer (PADO) packet at the CPE device from the BRAS;
generating a tag identifying a product model of the CPE device;
transmitting from the CPE device to the BRAS a point-to-point over Ethernet (PPPoE) active discovery request (PADR) packet that includes the tag identifying the product model of the CPE device; and
establishing a point-to-point (PPP) connectivity session between the CPE device and the BRAS after transmission of the tag that identifies the product model of the CPE device, wherein the tag that identifies the product model of the CPE device is transmitted after broadcasting the PADI packet and before establishment of the PPP connectivity session, and wherein the PADI packet does not contain the tag that identifies the product model of the CPE device.

2. The method of claim 1, wherein the tag includes host-uniq tag information.

3. The method of claim 2, wherein the host-uniq tag information includes a device identifier code that identifies the product model of the CPE device.

4. The method of claim 3, further comprising generating the device identifier code.

5. The method of claim 3, wherein the device identifier code includes a binary number.

6. The method of claim 1, further comprising:

receiving a point-to-point over Ethernet (PPPoE) active discovery session (PADS) packet at the CPE device from the BRAS; and conducting an Ethernet communication session between the CPE device and the BRAS.

7. The method of claim 6, further comprising receiving a media access control (MAC) address of a peer device at the CPE device from the BRAS.

8. The method of claim 7, further comprising establishing a PPPoE session identification.

9. A network management system, comprising a server adapted to:

communicate with a distributed network to receive a plurality of point-to-point over Ethernet (PPPoE) active discovery packets from a plurality of customer premises equipment (CPE) devices;

identify each of the plurality of CPE devices based on the plurality of PPPoE active discovery packets, wherein each of the plurality of PPPoE active discovery packets includes a tag comprising a device identifier field that uniquely identifies a product model of a CPE device that transmitted the PPPoE active discovery packet, wherein the plurality of PPPoE active discovery packets including the tag with the device identifier field is received before establishing a point-to-point (PPP) connectivity session, and wherein the device identifier field is generated after transmission of a PPPoE active discovery initiation (PADI) packet and before establishing the PPP connectivity session;

transmit a plurality of PPPoE active discovery offer packets to the plurality of CPE, devices;

receive a plurality of PPPoE active discovery request packets from the plurality of CPE, devices; and establish the PPP connectivity session.

10. The network management system of claim 9, further comprising a database to store each device identifier field.

11. The network management system of claim 10, wherein the server uses the database to determine a product model of each of the plurality of CPE devices based on the device identifier field of the tag in the PPPoE active discovery packet transmitted by the CPE device.

12. The network management system of claim 11, wherein the server is adapted to send information indicating the product model of at least one of the plurality of CPE devices to a customer service representative for diagnosis and repair.

13. The network management system of claim 9, wherein the server is adapted to conduct a plurality of Ethernet communication sessions, wherein each of the plurality of Ethernet communication sessions is conducted with at least one of the plurality of CPE devices.

14. The network management system of claim 13, wherein at least one of the Ethernet communication sessions is conducted via an asynchronous transfer mode (ATM) connection.

15. The network management system of claim 13, wherein at least one of the Ethernet communication sessions is conducted via an asymmetric digital subscriber line (ADSL) connection.

* * * * *